UNITED STATES PATENT OFFICE.

JOHN JAMES DILLARD, OF EUREKA SPRINGS, ARKANSAS.

MEDICATED SOAP.

SPECIFICATION forming part of Letters Patent No. 287,642, dated October 30, 1883.

Application filed September 13, 1883. (No specimens.)

*To all whom it may concern:*

Be it known that I, JOHN JAMES DILLARD, of Eureka Springs, in the county of Carroll and State of Arkansas, have invented a new and useful Improvement in Medicated Soap; and I do hereby declare that the following is a full, clear, and exact description of the same.

My invention consists of an improved toilet and curative soap, specially adapted to the treatment of skin diseases—such as salt rheum, tetter, ring-worm, dandruff, itch, rash, blotches, old sores, &c.—and which is also an agreeable article of soap for the bath and toilet, keeps the skin soft, and prevents chapping.

In preparing my soap I take five pounds Eureka Springs condensed water, one pound sulphur, one and one-half pound glycerine, three-fourths pound borax, two and one-half ounces chrysophanic acid, and nine ounces tincture arnica. The chrysophanic acid is dissolved in the tincture of arnica and filtered, and these two ingredients are added to the borax and sulphur, which have been previously prepared as follows: The borax is boiled in the five pounds of water, and the sulphur is added when the water is boiling. These ingredients are well stirred and taken from the fire, and, being well covered, are allowed to cool for about ten minutes. It is then filtered, and to it are added the chrysophanic acid and arnica. I then take thirty-five pounds of English concentrated lye prepared by being boiled in Eureka Springs water until it reaches 36° by the hydrometer (Reaumur's scale) when cooled. Then take seventy pounds of cocoanut-oil heated to 42°, (Reaumur's,) and the lye thus prepared is slowly mixed with the cocoanut-oil. To this are added all of the former ingredients, and then the glycerine. Then add three-fourths pound of oil of sweet almond, sassafras, or other scent, and stir up well together. The composition is then poured into molds and cooled, cut, and stamped or pressed into cakes.

The Eureka Springs water referred to as one of the ingredients is obtained from the Eureka Springs of Arkansas, and its mineral constituents for one gallon of two hundred and thirty-one cubic inches are: chloride sodium, 0.19 grains; sulphate soda, 0.09 grains; bicarbonate soda, 0.15 grains; sulphate potash, 0.13 grains; bicarbonate lime, 4.43 grains; bicarbonate magnesia, 0.47 grains; iron and alumina, 0.08 grains; silica, 0.31 grains; free ammonia, 0.14 grains; albuminoid ammonia, 0.07 grains. This water is concentrated by evaporation to one-fourth its volume, which has the effect of multiplying the amount of mineral constituents for a given body of water four times. With this formula it is easy to prepare the chemical equivalent of the water when the original water cannot be obtained.

Having thus described my invention, what I claim as new is—

The soap herein described, compounded of the following elements: Eureka Springs water, or its chemical equivalents, sulphur, glycerine, borax, chrysophanic acid, tincture arnica, cocoanut-oil, and concentrated lye, in or about the proportions described.

JOHN JAMES DILLARD.

Witnesses:
  A. DAVIS,
  W. B. SMITH.